United States Patent [19]

Auslander et al.

[11] Patent Number: 5,681,381
[45] Date of Patent: *Oct. 28, 1997

[54] FLUORESCENT RED AND MAGENTA WATERFAST INK JET INKS

[75] Inventors: Judith D. Auslander, Westport, Conn.; Shunichi Higashiyama, Yokkaichi, Japan

[73] Assignee: Pitney Bowes Inc., Stamford, Conn.

[*] Notice: The term of this patent shall not extend beyond the expiration date of Pat. No. 5,674,314.

[21] Appl. No.: 570,140

[22] Filed: Dec. 11, 1995

[51] Int. Cl.$^6$ .................................... C09D 11/02
[52] U.S. Cl. .............................. 106/21 A; 106/22 B
[58] Field of Search ............................ 106/21 A, 22 R, 106/22 B

[56] References Cited

U.S. PATENT DOCUMENTS

| | | | |
|---|---|---|---|
| 2,970,965 | 2/1961 | Switzer | 106/20 B |
| 3,230,178 | 1/1966 | Bennahmias | 252/301.35 |
| 3,361,677 | 1/1968 | Voedisch | 252/301.35 |
| 3,429,825 | 2/1969 | Voedisch | 252/301.35 |
| 3,455,856 | 7/1969 | Voedisch et al. | 106/23 B |
| 3,518,205 | 6/1970 | Vukasovich | 252/301.35 |
| 3,915,884 | 10/1975 | Kazenas | 252/301.35 |
| 3,961,965 | 6/1976 | Zwahlen | 106/22 R |
| 4,150,997 | 4/1979 | Hayes | 106/21 R |
| 4,153,593 | 5/1979 | Zabiak et al. | 106/21 R |
| 4,186,020 | 1/1980 | Wachtel | 106/21 A |
| 4,243,694 | 1/1981 | Mansukhani | 106/21 A |
| 4,328,332 | 5/1982 | Hayes et al. | 528/296 |
| 4,508,570 | 4/1985 | Fujii et al. | 106/22 R |
| 4,705,567 | 11/1987 | Hair et al. | 106/22 R |
| 4,761,180 | 8/1988 | Askeland et al. | 106/22 R |
| 4,791,165 | 12/1988 | Bearss et al. | 524/516 |
| 4,923,515 | 5/1990 | Koike et al. | 106/22 R |
| 5,084,205 | 1/1992 | Auslander | 106/22 B |
| 5,114,478 | 5/1992 | Auslander et al. | 106/21 A |
| 5,145,518 | 9/1992 | Winnik et al. | 106/20 C |
| 5,169,436 | 12/1992 | Matrick | 106/20 D |
| 5,211,747 | 5/1993 | Breton et al. | 106/20 R |
| 5,275,646 | 1/1994 | Marshall et al. | 106/20 B |
| 5,286,287 | 2/1994 | Winnik et al. | 106/21 A |
| 5,290,348 | 3/1994 | Auslander | 106/20 R |
| 5,342,439 | 8/1994 | Lauw | 106/22 H |

FOREIGN PATENT DOCUMENTS 0 463 260 A1  1/1992  United Kingdom .

OTHER PUBLICATIONS

Applications for fluorescent pigments; Apr. 1973 by H H Lavell, B.Sc Sericol Gr Ltd.
Daylight fluorescent pigments and their appls Jun. 1978 by PJ Ryan Swada, London Ltd.
Special Color Feature Fluorescent Pigments Aug. 1970 reprnt fr: Ptn & Var Prod.

*Primary Examiner*—Helene Klemanski
*Attorney, Agent, or Firm*—Ronald Reichman; Melvin J. Scolnick

[57] ABSTRACT

Aqueous fluorescent inks are disclosed that fulfill United Sites Postal Service requirements for franking and/or automation compatibility, while being able to be used in an ink jet printer. The inks of this invention may be read by current United States Postal Service equipment. The inks are red fluorescent and waterfast, having improved print quality. The formulations are based on water, cosolvent and penetrant solutions of fluorescent toners. The cosolvents are low vapor pressure, polar solvents, and glycol ethers as penetrants.

26 Claims, No Drawings

FLUORESCENT RED AND MAGENTA WATERFAST INK JET INKS

CROSS REFERENCE TO RELATED APPLICATIONS

Reference is made to commonly assigned copending patent application Ser. No. 08/570,224, Docket No. E-408, filed herewith entitled "Waterfast Ink Composition For Printers" in the names of Judith Auslander and Shunichi Higashiyame.

FILED OF THE INVENTION

The invention relates generally to inks, and more particularly to inks that may be used in an Ink jet printer.

BACKGROUND OF THE INVENTION

Red fluorescent inks have been used in postage meters or franking machines for imprinting postal indicia. Inks used for the printing of postal indicia in the United States have to be red fluorescent so that automatic sorting equipment may be used by the United States Postal Service. The excitation wave length of a typical red fluorescent ink is 254 nm while the emission radiation is in the range of 580–640 nm. The image obtained with the red fluorescent inks has to be permanent, i.e. good water fastness, smear fastness and light fastness i.e., greater than 95%. Also, the images on various substrates have to show enhanced contrast properties.

Postal indicia or franking machines have been developed that use digital printing technology to permit the use of variable information on the postal indicia and have more accurate printing and indicia print quality. The enhanced print quality will enable the postal indicia to be easily read by optical character recognition equipment, bar code readers and other types of technologies.

The introduction of digital printing and franking is conditioned by the existence of inks that are suitable for franking, but at the same time are functional with the specific ink jet technology. Currently, the closest inks that meet the above criteria are the magenta inks that are used in ink jet printers. The aforementioned magenta inks are accidentally fluorescent, since the choice of the magenta dyes is very narrow and the most brilliant available magenta dyes are fluorescent. One of the few available water soluble magenta dyes is the Acid Red 52. The Acid Red 52 has satisfactory solubility in water but a very low water fastness. Thus, a disadvantage of the magenta Acid Red 52 ink is that the ink bleeds under water exposure. Another disadvantage of using current magenta inks is that prints obtained with these inks offset on the back of neighboring envelopes when exposed to water and the offset prints show an increased fluorescent signal. The dilution of the fluorescent ink causes the above by decreasing the concentration quenching effect. Therefore, current magenta inks experience back ground offset fluorescence. This causes matter that is not an indicia to appear as an actual indicia printed on an envelope. The above causes Postal Service equipment to erroneously reject postal indicia. Thus, the above effect can cause increased cost to the Postal Service.

Another disadvantage of prior art piezoelectric ink jet inks which are water fast is that the inks use different organic solvents instead of water. Various organic solvents, such as tripropylene glycol methyl ether or other glycol ethers, are used to improve the water fastness. The reason for the above is that the solvents dissolve or disperse colorants that are insoluble in water. Due to safety and compatibility requirements, with various plastic materials used in ink jet print heads, water is nevertheless desirable as the main solvent. The reason why water is desirable as a solvent when plastic materials are used is that water is much less aggressive than the organic solvents. The widely used plastic materials for ink jet printer parts are inker foam, cartridge material, glue, printer base, etc. The above parts may be made for example from Acrylonitrile styrene (AS), Polymethyl metaacrylate (PMMA), and Acrylonitrile butadiene styrene (ABS). Therefore, the disadvantage of using organic solvents is that they attack plastic materials. Once plastic materials are attacked, the printer would not work properly. A water based ink is desirable as the main solvent since it's inert to most ink jet printer components.

If a fluorescent ink is going to be used in an ink jet printer, the fluorescent ink must have certain physical properties, such as a certain viscosity and a specified surface tension. The viscosity of the liquid inks used in current piezoelectric ink jet printers is 1.5–20 cps and in the thermal ink jet printer is yew low (1–5 cps). The desirable surface tension of liquid ink jet printer inks should be between 30–45 dynes/cm.

A disadvantage of current water based ink jet inks is that the ink has a tendency to dry in the nozzles of the printer, during operation of the printer and between operations of the printer.

One of the properties of an ink that is used in an ink jet printer is the decap time, which is the length of time over which an ink remains fluid in a nozzle opening when exposed to air and capable of firing a drop. Precipitation of the solid in the ink is what causes failure or coagulation in the ink and is often due to evaporation of the solvent causing precipitation or crystallization of a solid at the air/liquid surface.

Another disadvantage of the water based inks is that they have to use "naked" (pure) dyes without resins in order to achieve good solubility. The dyes should be preferably direct, acid, basic or reactive.

If the solubility of the colorant material in the solvent is not good enough, the drops stability, and the print quality are poor. The long term solubility which affects the shelf life depends on the colorant solubility in the solvent in various environmental conditions of temperature and humidity. The dyes that exhibit good water solubility suffer from deficiency in water fastness and smear fastness on the generated prints. The foregoing occurs because of the prints redisolution in water.

Another disadvantage of dye based inks is that they produce prints with high edge roughness and poorly defined characters which is also called feathering. The foregoing disadvantage is more apparent at lower resolutions such as 240 dpi, where there is less overlap between the dots.

Therefore, pigments which are insoluble in water are a preferred alternative to dyes provided that pigments dispersions can be made stable to sedimentation and gelling.

The problem of using pigments is that they exhibit fragile equilibrium in dispersion. The dispersions are easily destabilized by changes in temperature, humidity and impurities.

Other typical liquid ink properties are the inks ability to penetrate paper and to dry fast by absorption. Another problem with fast penetrating inks is that the optical density decreases with the ink penetration. The above effect has to be compensated for in order to achieve good print quality. Good print quality may be achieved by using dyes with high absorbance values. This can have an adverse effect on the fluorescent signal (lowering the signal) of the prints due to quenching.

Another problem of prior art inks is that they do not give consistent print quality on a large variety of substrates. Postage meter inks have to be used on a large variety of paper envelopes. The components of the paper can be inhibiting for the fluorescence or can have adverse effects on the optical density of the prints. The wax based inks such as hot melt ink do not interact with the paper in the same manner as the liquid inks. Therefore, there is a need for a liquid franking ink that will have consistent fluorescence and optical density on a large variety of envelopes, while interacting with the paper.

SUMMARY OF THE INVENTION

This invention overcomes the disadvantages of the prior art by providing a liquid fluorescent ink that fulfills the United States Postal Service requirements for franking and/ or automation compatibility, while being able to be used in an ink jet printer. The inks of this invention may be read by current U.S. Postal Service optical character recognition equipment and/or bar code reading systems when the incident scanning light is in the green region of the spectrum. The inks of this invention are safe for use in an office environment. The inks also are non toxic and inert to the range of materials used in the print heads of current ink jet printers. Some of the materials in ink jet print heads are polycarbonate (PC), Polystyrene (PS), and Polyphenyleneoxide. One of the advantages of the inks of this invention is that the inks provide a permanent image (water and light fast) on a large variety of substrates.

The inks disclosed herein are based on solution of soluble toners in water/cosolvent systems. The prints obtained with the inks of this invention are resistant to water exposure either by drainage or by dipping in water. Also the inks do not offset while exposed to water and when they are in contact under pressure with other pieces of paper. The inks of this invention are based on water as a main solvent (greater than 35%) and other cosolvents which are water soluble. The water soluble organic solvents serve to prevent clogging at the nozzle through moisture retention (hygroscopicity) and at the same time improve the stability of the ink. The other role of the organic solvents is to decrease the surface tension of the ink and increase the paper spreading and drying time. The last role of the cosolvent is to improve the solubility of the toner for the range of various types of toners compatible with the vehicle. The toner is a solid solution of a dye in a resin that is soluble or partially soluble in water, or in a water soluble organic solvent.

The water soluble solvents have to be polar. Solvent polarity is the over-all solvation ability of a solvent which in turn is determined by the sum of all the molecular properties responsible for the interactions between the solvent and the solute. These intermolecular forces are: columbic, directional, inductive, dispersion, charge transfer and hydrogen bonding. The solvent polarity is defined quantitatively by physical parameters: $\epsilon$ the dielectric constant and $\mu$ the permanent dipole moment. The dielectric constant describes the ability of a solvent to separate electrical charges and orient its dipolar molecules. The permanent dipole moment of a molecule is given by the product of the charges of the dipole units and the distance separating the two dipole charges. Another empirical parameter used for defining over all solvent polarity is the standard absorption of organic compounds ($E_t$) determined by the $\lambda_{max}$ of organic compounds in different solutions. Examples of the water-soluble organic solvents with low vapor pressure are: glycerol, ethylene glycol, diethylene glycol, triethylene glycol, propylene glycol, dipropylene glycol, hexylene glycol, polyethylene and polypropylene glycol.

The water soluble organic cosolvents may be used alone or in combination of two or more of them. The cosolvents used in the ink formulations have to be totally miscible with water, good solvents for a broad range of polar resins, nonvolatile (vapor pressure at room temperature less than 0.1 mm/Hg) and inert to the commonly used plastic materials. Further, it is preferred for the ink composition of the present invention to further contain highly volatile monhydric alcohols such as ethanol, propanol and isopropanol, from the viewpoint of improving the quick drying and fixing of prints.

In the ink composition according to the present invention, when the water soluble organic solvents are used alone, the Hildebrand solubility parameter (SP value) of the water soluble organic solvent used is preferably 12 cal/cm$^3$ or more. Also, when the water soluble organic solvents are used in combination of two or more of them, the SP value of the mixed organic solvent is preferably 12 cal/cm$^3$ or more. The SP value of the mixed solvent can be determined from the following equation.

$$\delta_{mix} = \frac{X_1 V_1 \delta_1 + X_2 V_2 \delta_2 + X_3 V_3 \delta_3 + \ldots X_n V_n \delta_n}{X_1 V_1 + X_2 V_2 + X_3 V_3 + \ldots X_n V_n}$$

wherein $\delta$ represents an SP value of each solvent, X represents a molar fraction of each solvent in the mixed solvent, V represents a molar volume of each solvent and n is a subscript representing the kind of the solvent and an integer of 2 or more. Other solvents that can be used are: 2-pyrrolidone, N-methyl pyrrolidone, sulfolane, gamma butyrlactone, etc.

The hygroscopic characteristics of the organic cosolvents used in the ink formulations prevent drying at the ink jet nozzles and therefore improve the ink reliability in the print head. An additional advantage of the inks of this invention is the high water and cosolvent solubility of the soluble toner which improves the shelf life of the ink. The general characteristics of these solvents as expressed in partial Hansen solubility parameters ($\delta_\delta$(dispersion)), $\delta_p$ (polar), $\delta_h$ (hydrogen bonding)) are as follows. For the category of solvents with low dispersion solubility parameter, $\delta_\delta$(7–8.3) they should have, $\delta_h$>8.0, $\delta_p$>5.0. Examples are: diethylene glycol ($\delta_\delta$ of 7.9), triethylene glycol ($\delta_\delta$ of 7.8). From the category of high $\delta_\delta$(8.4–10.0) they should have $\delta_h$>5.0, $\delta_p$ of 8.0–8.7. Some examples of the foregoing are: 2-pyrrolidone, N-methyl pyrrolidone, sulfolane, gamma butyrlactone, etc. The Water Soluble organic solvents individually or in solution do not exceed a viscosity of 20 cps.

The increased solubility of the colorant of the inks of this invention in water or in the solvent system used, makes this ink very efficient; and provides efficient jetting ability. Hence, good print quality is obtained. To the water/cosolvent solution which also may be a cosolvent mixture a glycol ether is added. The glycol ether serves as a dye stabilizer, wetting and as a coupling agent. The glycol ethers are intramolecularly hydrogen bonded. They can therefore act as bridging solvents and assume the polar or non polar nature of their surrounding environment. The glycol ethers may act as polar solvents with polar resins and with less polar resins the above glycol ethers may act as non polar solvents. Therefore, they serve to solubilize relatively non polar resins in water. Examples of glycol ethers are: diethylene glycol ethyl ether; triethylene glycol ethyl ether; diethylene glycol butyl ether; diethylene glycol propyl ether; tetraethylene glycol dimethyl ether, tripropylene glycol isopropyl ether, tripropylene glycol ether, diethylene glycol monohexyl ether; and propylene glycol butyl ether. All of the glycol ethers should have a viscosity less than 20 cps. Another very important role of the glycol ether is that they are strong penetrants into paper.

The ink formulation of this invention consists of an aqueous carrier medium, a "water like" organic polar solvent, "a water soluble toner containing a fluorescent dye encapsulated in a resin matrix and cosolvent penetrants such as propylene glycol butyl ether, diethylene glycol, or triethylene glycol butyl ether.

In order to solubilize toners based upon acid resins non ionic surfactants have to be added. The non ionic surfactants have HLB values from 8–15. The surfactants belong to the class of nonyl phenoxy poly (ethyleneoxy) ethanol or decyl and tridecyl alcohol ethoxylates.

Other additives, such as dimethyl hydantoin can be used for good decap performance. The resultant inks are fluorescent, have brilliant color, are water fast on a large variety of substrates/envelopes. They are also non toxic and inert to most of the materials used in the print head. These inks exhibit rapid drying, are storage stable and give images having good print quality, and permanence. In essence, the ink formulation of this invention is a water/cosolvent based ink that uses toners that contain dyes encapsulated in a resin matrix instead of dyes. Hence, the major solvent of the ink formulation is water, while at the same time, the dye protected by the resin is not bleeding under water exposure and a water environment. Therefore, the resulting print is waterfast.

Water based inks may be formulated that contain between 30–60% water with additional cosolvents that are water soluble and water like, like glycols, diethylene glycol, triethylene glycol, tetraethylene glycol (which have a relatively low viscosity) and/or other polar solvents, such as 2-pyrrolidone or N-methyl pyrrolidone or gammabutylactone or sulfolane may be used. All of the above solvents are nonvolatile, hygroscopic, and at the same time dissolve well in water causing an increase in the viscosity. The above solvents have a high dipole moment which is greater than 2.3 but preferably greater than 3 and with high hydrogen bonding solubility parameters which are greater than 5. The combination of the toner, water/solvent, and peneterant have to be adjusted for a desired viscosity.

The aforementioned solvents have to comply with all government safety standards that are defined by applicable statues and regulations. Therefore, a safe solvent may be defined as a solvent with a mild or moderate skin and eye irritation index and a half life lethal dose greater than 1 g/kg.

Another property of the ink formulation is that the using of an additive like a glycol ether such as propylene glycol, n- butyl ether or triethylene glycol butyl ether improves the water fastness and the speed of penetration of the ink into the paper. The above solvents also have a strong effect on the dye stabilization. The water fastness is improved by the fact that the penetrant helps the toner to sink deeper into the paper fiber thus, protecting the dye from being released from the resin.

The use of toners i.e., dyes encapsulated in a resin results in a performance similar to a soluble dye in solution and as a pigment on paper.

The solubility of the colorant has to be high enough so as not to cause problems in the shelf life, or in the ejection stability. At the same time, when the ink hits the paper, it has to become insoluble in water or in any other material that may come in contact with the paper, like coffee, bleaching agents or other liquids that can be exposed to a print. The desired shelf life of more than one year is achieved by using very soluble toners like dimethyl hydantoin/formaldehyde or by adding non ionic surfactants acid resins (polyester polyamide). The non ionic surfactants belong to tridecyl alcohol alkoylates or nonyl phenoxy poly (ethyleneoxy) ethanol with HLB between 8 and 13 at concentrations of trace to 3%.

Another advantage of using toners instead of dyes, is that toners do not loose their fluorescent signal as a result of being immobilized and protected by the resin and there is no concentration quenching effect such as for pure dyes. The foregoing is true since, there is no mutual interaction or collision between the dyes and therefore, reabsorption of radiation. Therefore, after the toner is laid on the paper, after evaporations and/or absorption of the solvent, the properties of the toner are more similar to a pigment than to a dye, because of the protection by the resin. The water solubilization of the toner on the printed image is also hindered due to the fact that the dye is protected by the resin. Therefore, by using fluorescent toner, a dual effect is obtained i.e., the functioning as a dye in the ink solution in the cartridge and print head and as a pigment when printed on the paper. Other effects similar to pigmented inks include enhanced contrasts, high optical density, image permanence and superior edge definition. In addition to the toner/solvent mixtures "loose" dye is added to enhance the contrast. In the case of fluorescent inks, the dyes are selected mainly from the group of yellow dyes which can be fluorescent or non fluorescent. Some examples are: C.I. Direct Yellow 86, C.I. Acid Yellow 210, C.I. Basic Yellow, 40, C.I. Basic Yellow 51, C.I. Basic Yellow 2. The pure dye added to the ink is soluble in the solvent mixture and belongs to the categories of solvent, acid, direct, or basic dyes. The concentration used is 0.1 to 3.0%.

DETAILED DESCRIPTION OF THE PREFERRED EMBODIMENT

The formulation of the ink of the instant invention provides fluorescent inks that are capable of being used in an ink jet printer and are inert to materials used in the printer. One example of an ink jet printer in which the ink formulation of this invention may be used is the ink jet printer portion of a postage metering system. These systems, sometimes referred to as postage evidencing devices, print postage. One type of postage metering system includes an ascending register for maintaining a record of all postage dispensed by the postage metering system and a descending register for maintaining a record of the amount of postage that has been purchased by the user of the metering system. Other postage evidencing systems are also in wide use throughout the world. In these various systems, the ink jet printer is utilized to print a postal indicia.

Composition of the ink, in accordance with the invention comprises: fluorescent toner or mixture thereof from 5–15%, water 35–55%, cosolvent which is a water soluble organic solvent from 15–50% or a mixture thereof and Glycol Ether as additive 3–15%. Other agents that can be used for solubilization or pH stabilization are low volatility alkali components, or acid components of food grade or for cosmetics to modify pH. Specific preferred examples of the nonvolatile alkali components include alkanolamines, for examples, mono ethanolamine, N-n dimethylethanolamine, N-n diethylethanolamine, diethanolamine, triethanolamine, N-n-butyldiethanolamine and triisopropanolamine.

The ink composition of the invention is suitable employed with any ink jet printer for any drop on demand ink jet technology. However, it is particularly useful in piezoelectric ink jet technology.

Fluorescent toner is defined as a solid solution of a dye in a polar resin matrix. The fluorescent dye can belong to various dye groups, such as xanthene, triarylcarbonium, cyanine, etc. Also the dye categories can include direct dyes, solvent dyes, acid dyes, or basic dyes. The concentration of the dye in the toner ranges from 1–8%. Examples of suitable dyes include, Acid Red 52, Basic Red 1, Basic Violet 11, Rodamine 101, Direct Red 9, Acid Red 249, Acid Yellow 23, Solvent Yellow 44, Solvent Yellow 43, Solvent Yellow 135, Basic Yellow 40, etc. Many other suitable dyes may be used. It is contemplated that any of the dyes currently used in inks for ink jet printers may be used as dyes in the ink formulation of this invention. The resin used to dissolve any of the dyes belong to the type triazine formaldehyde sulfonamide and can be either urea formaldehyde, melamine formaldehyde or benzoguanamine formaldehyde which are cross linked with para toluene sulfonamide. Other resins that can be used are polyester/polyamide. The above resins have a average molecular weight between 200 and 1,000 and a high acid number (90–150). An alternative resin matrix is dimethyl hydantoin formaldehyde which has a good water solubility. Generally, the resins have a very low molecular weight, preferably less than a thousand.

The triaziane amino formaldehyde are not charged while the polyester/polyamide resins are. The acid numbers are higher than 50 for polyester/polyamide resins and the last two types of resins have better water solubility than triazine amino formaldehyde.

The water soluble solvents that are used can belong to the group of glycols, including propylene glycols, polypropylene glycols, ethylene glycols, polyethylene glycols, and glycerols. Any, of the glycol families of ethers and mixtures thereof may also be used. Other safe "water like" solvents, with low viscosity that can be used are 2-pyrrolidone, gamma butyrlactone.

Hygroscopic properties of the water like solvents of the above type aids in the formation of the soft plug of ink in the orifice of the print head of the ink jet printer. The soft plug means that there is a very thin layer formed in the orifice that can be easily broken upon firing of the print head. The additives, used in this ink formulations are propylene glycol, n-butylether, triethylene glycol n-butyl ether or diethylene glycol ethers that are strong penetrants and therefore improve the speed of penetration into the paper and also the water fastness of the prints. The long term solubility of the colorants in the solvent system required for a long shelf life (more than 12 months) is achieved by adding non ionic surfactants. The non ionic surfactants can have HLB from 8 to 13 in order to achieve solubilization of polyester/polyamide toner. The non ionic surfactants with HLB>8 are also less damaging to the plastic materials used in the printhead.

The general composition of the ink is as follows:

| INGREDIENT | (WT. %) |
|---|---|
| 1. Fluorescent toners | 5–15 |
|    a. urea formaldehyde toluene sulfonamide manufactured by Sterling 410 series mixtures of magenta or yellow, or Day-Glo HMS series | |
|    b. polyester polyamide (nonformaldehyde) manufactured by Radiant ST series Magenta and Yellow | |
|    c. dimethyl hydantoin formaldehyde manufactured by Lawter HVWT series magenta, red or yellow | |
| 2. Dyes | trace–1.5 |
|    a. C.I. Direct Yellow 86 manufactured by Daiwa or Aakash | |
|    b. Acid Yellow 194 manufactured by BASF | |

-continued

| INGREDIENT | (WT. %) |
|---|---|
|    c. any other yellow dye i.e. Basic Yellow 40, soluble in the solvent system may be used | |
| 3. Water | 35–55 |
| 4. Cosolvents or mixtures or individual solvents | 15–50 |
|    a. 2-pyrrolidone | |
|    b. N-methyl pyrrolidone | |
|    c. sulfolane | |
|    d. diethylene glycol | |
|    e. gamma butyrlactone | |
|    f. other solvents that will match the water like definition described herein | |
| 5. Penetrants (glycol ether) | 5–15 |
|    a. triethylene glycol n-butyl ether | |
|    b. diethylene glycol n-butyl ether | |
|    c. propylene glycol isopropyl ether | |

The following examples are exemplary of the invention and should not be considered as limiting.

For all of the following examples the L, a, b values are in the approximate range of L=60±10, a=35±10, b=5±10, where L, a, b are Hunter color coordinates.

EXAMPLE 1

| Composition | |
|---|---|
| Water | 47.6 wt % |
| 2-Pyrrolidone | 17 wt % |
| Polyethylene Glycol #200 | 10 wt % |
| Triethylene Glycol n-butyl Ether | 10 wt % |
| Fluorescent toner HV WT 54 from Lawter International | 15 wt % |
| C.I. Basic Yellow 40 | 0.4 wt % |
| Properties on Xerox 4024 Paper by Draw Down | |
| Peak of Emission Spectrum (nm) | 608 |
| Fluorescent Intensity (relative number) | 5976 |
| Fluorescent Intensity (Phosphor Meter Units) (measured with instrument proprietary to U.S. Postal Service) | >99 |
| Optical Density | 0.73 |
| Waterfastness (after dipping test) | |
| Peak of Emission Spectrum (nm) | 597 |
| Fluorescent Intensity (relative number after) | 9167 |
| Fluorescent Intensity (Phosphor Meter Units) | >99 |
| Optical Density | 0.71 |
| Optical Density (bleeding part) | 0.11 |

Print Performance on various envelopes of example 1 ink by printhead (20% duty).

| Envelope Type | Print Performance | | | | | |
|---|---|---|---|---|---|---|
| | OD | PMU | after water OD | after water PMU | OD after water | OD of bleeding part |
| A - white wove, 24, lb. low ink absorbing | 0.09 | 46 | 0.55 | 51 | 0.50 | 0.11 |
| B - white wove, 24 lb., high ink absorbing | 0.09 | 46 | 0.54 | 28 | 0.45 | 0.11 |
| C - 24 lb. Smooth finish | 0.09 | 36 | 0.52 | 33 | 0.46 | 0.12 |
| D - 24 lb. Classic laid finish | 0.12 | 30 | 0.58 | 56 | 0.52 | 0.14 |
| E - 9 × 12 32 lb., 90 clasp | 0.42 | 53 | 0.77 | 9 | 0.74 | 0.43 |
| F - Clay filled | 0.07 | 18 | 0.55 | 24 | 0.53 | 0.07 |

-continued

| paper stock | | | | | | |
|---|---|---|---|---|---|---|
| G -Calendared paper stock | 0.05 | 51 | 0.50 | 47 | 0.47 | 0.06 |
| H - Air mail, #10 calendared matl. | 0.14 | 58 | 0.53 | 15 | 0.52 | 0.14 |
| I - Recycled paper stock | 0.09 | 21 | 0.61 | 19 | 0.53 | 0.10 |
| J - Tyvek | 0.04 | 32 | 0.61 | 25 | 0.35 | 0.10 |
| K - European market, DL | 0.11 | 6 | 0.59 | 7 | 0.56 | 0.11 |

EXAMPLE 2

Composition

| | |
|---|---|
| water | 48.5 wt % |
| 2-Pyrrolidone | 10 wt % |
| Triethylene Glycol | 19 wt % |
| Triethylene Glycol n-butyl Ether | 10 wt % |
| Fluorescent Toner HVWT 54 from Lawter International | 12 wt % |
| C.I. Basic Yellow 40 | 0.5 wt % |

Properties on Xerox 4024 Paper by Drawn Down

| | |
|---|---|
| Peak of Emission Spectrum (nm) | 606 |
| Fluorescent Intensity (relative number) | 5651 |
| Fluorescent Intensity (Phosphor Meter Units) | 92 |
| Optical Density | 0.70 |

Waterfastness (after dipping test)

| | |
|---|---|
| Peak of Emission Spectrum (nm) | 598 |
| Fluorescent Intensity (relative number) | 5876 |
| Fluorescent Intensity (Phosphor Meter Units) | 93 |
| Optical Density | 0.69 |
| Optical Density (bleeding part) | 0.10 |

EXAMPLE 3

Composition

| | |
|---|---|
| water | 45 wt % |
| Diethylene Glycol | 40 wt % |
| Triethylene Glycol n-butyl Ether | 10 wt % |
| Fluorescent Toner HVWT 36 from Lawter International | 5 wt % |

Properties on Xerox 4024 Paper by Drawn Down

| | |
|---|---|
| Peak of Emission Spectrum (nm) | 593 |
| Fluorescent Intensity (relative number) | >10000 |
| Fluorescent Intensity (Phosphor Meter Units) | >99 |
| Optical Density | 0.39 |

Waterfastness (after dipping test)

| | |
|---|---|
| Peak of Emission Spectrum (nm) | 591 |
| Fluorescent Intensity (relative number) | >10000 |
| Fluorescent Intensity (Phosphor Meter Units) | >99 |
| Optical Density | 0.36 |
| Optical Density (bleeding part) | 0.10 |

EXAMPLE 4

Composition

| | |
|---|---|
| water | 42 wt % |
| 2-pyrrolidone | 25 wt % |
| N-methyl pyrrolidone | 10 wt % |
| Triethylene Glycol n-butyl Ether | 10 wt % |
| Fluorescent Toner Flare 410 Magenta 37 from Sterling | 12 wt % |
| C.I. Direct Yellow 86 | 1 wt % |

Properties on Xerox 4024 Paper by Draw Down

| | |
|---|---|
| Peak of Emission Spectrum (nm) | 601 |
| Fluorescent Intensity (relative number) | 5524 |
| Fluorescent Intensity (Phosphor Meter Units) | 91 |
| Optical Density | 0.75 |

Waterfastness (after dipping test)

| | |
|---|---|
| Peak of Emission Spectrum (nm) | 606 |
| Fluorescent Intensity (relative number) | 5120 |
| Fluorescent Intensity (Phosphor Meter Units) | 82 |
| Optical Density | 0.75 |
| Optical Density (bleeding part) | 0.10 |

EXAMPLE 5

Composition

| | |
|---|---|
| water | 37 wt % |
| 2-pyrrolidone | 30 wt % |
| N-methyl pyrrolidone | 10 wt % |
| Triethylene Glycol n-butyl Ether | 10 wt % |
| Fluorescent Toner HMS 30 from Day Glo | 12 wt % |
| C.I. Direct Yellow 86 | 1 wt % |

Properties on Xerox 4024 Paper by Draw Down

| | |
|---|---|
| Peak of Emission Spectrum (nm) | 595 |
| Fluorescent Intensity (relative number) | 5315 |
| Fluorescent Intensity (Phosphor Meter Units) | 89 |
| Optical Density | 0.77 |

Waterfastness (after dipping test)

| | |
|---|---|
| Peak of Emisdon Spectrum (nm) | 599 |
| Fluorescent Intensity (relative number) | 5150 |
| Fluorescent Intensity (Phosphor Meter Units) | 83 |
| Optical Density | 0.77 |
| Optical Density (bleeding part) | 0.10 |

EXAMPLE 6

Composition

| | |
|---|---|
| water | 37 wt % |
| 2-pyrrolidone | 30 wt % |
| N-methyl pyrrolidone | 10 wt % |
| Triethylene Glycol n-butyl Ether | 10 wt % |
| Fluorescent Toner ST Magenta from Radiant | 12 wt % |
| C.I. Direct Yellow 86 | 1 wt % |

Properties on Xerox 4024 Paper by Draw Down

| | |
|---|---|
| Peak of Emission Spectrum (nm) | 604 |
| Fluorescent Intensity (relative number) | 5919 |
| Fluorescent Intensity (Phosphor Meter Units) | 95 |
| Optical Density | 0.78 |

Waterfastness (after dipping test)

| | |
|---|---|
| Peak of Emission Spectrum (nm) | 604 |
| Fluorescent Intensity (relative number) | 6253 |
| Fluorescent Intensity (Phosphor Meter Units) | 98 |
| Optical Density | 0.78 |
| Optical Density (bleeding part) | 0.10 |

EXAMPLE 7

| Composition | |
|---|---|
| water | 38.9 wt % |
| 2-pyrrolidone | 39.6 wt % |
| Triethylene Glycol n-butyl Ether | 10 wt % |
| Fluorescent Toner ST Magenta from Radiant | 9 wt % |
| C.I. Basic Yellow 40 | 0.5 wt % |
| Nonylphenoxypolyoxyethyleneglycolether | 2.0 wt % |
| Properties on Xerox 4024 Paper by Draw Down | |
| Peak of Emission Spectrum (nm) | 601 |
| Fluorescent Intensity (relative number) | 4920 |
| Fluorescent Intensity (Phosphor Meter Units) | 76 |
| Optical Density | 0.59 |
| Waterfastness offset | |
| Peak of Emission Spectrum (nm) | 603 |
| Fluorescent Intensity (relative number) | 4820 |
| Fluorescent Intensity (Phosphor Meter Units | 72 |
| Optical Density | .60 |
| Optical Density (bleeding part) | 0.10 |

The above embodiments have been given by way of illustration only, and other embodiments of the instant invention will be apparent to those skilled in the art, from consideration of the detailed description. Accordingly, limitation on the instant invention are to be found only in the claims.

What is claimed is:

1. A postage metering system having a printing mechanism for printing postage, the improvement comprising: within the printing mechanism employing a red aqueous magenta waterfast fluorescent ink containing water, water soluble organic solvents, red fluorescent soluble toners and glycol ether as a cosolvent penetrant that are inert to the materials contained in the printing mechanism.

2. The system of claim 1, wherein the red aqueous waterfast fluorescent ink composition consists essentially of:
   a. 35–55 (Wt. %) water;
   b. 15–50 (Wt. %) water soluble organic solvents having a hydrogen bonding solubility parameter ($\delta_h$) greater than 8.0, a polar solubility parameter ($\delta_p$) greater than 5.0 and a dispersion parameter ($\delta_S$) between 7–8.3;
   c. 5–15 (Wt. %) red fluorescent soluble toners with a average molecular weight between 200 and a 1,000; and
   d. 5–15 (Wt. %) of glycol ether as a cosolvent penetrant.

3. The system of claim 1, wherein the red waterfast aqueous fluorescent ink composition consists essentially of:
   a. 35–55 (Wt. %) water;
   b. 15–50 (Wt. %) water soluble organic solvents having a hydrogen bonding solubility parameter ($\delta_h$) greater than 5.0, a polar solubility parameter ($\delta_p$) between 8.0–8.7 and a dispersion parameter ($\delta_S$) between 8.4–10.0;
   c. 5–15 (Wt. %) fluorescent soluble toners with a molecular weight between 200 and a 1,000; and
   d. 5–15 (Wt. %) of glycol ether as a cosolvent penetrant.

4. The system claimed in claim 1, wherein said printing mechanism is an ink jet printer.

5. A red aqueous waterfast fluorescent ink composition consisting essentially of:
   a. 35–55 (Wt. %) water;
   b. 15–50 (Wt. %) water soluble organic cosolvents having a hydrogen bonding solubility parameter ($\delta_h$) greater than 8.0, a polar solubility parameter ($\delta_p$) greater than 5.0 and a dispersion parameter ($\delta_S$) between 7–8.3;
   c. 5–15 (Wt. %) red fluorescent soluble toners with a average molecular weight between 200 and a 1,000; and
   d. 5–15 (Wt. %) of glycol ether as a cosolvent penetrant.

6. The composition of claim 5, wherein the cosolvent penetrant is a glycol ether.

7. The composition of claim 6, wherein the glycol ether is selected from the group consisting of triethylene glycol ethyl ether, diethylene glycol ethyl ether, diethylene glycol propyl ether; tetraethylene glycol dimethyl ether, tripropylene glycol ether, tripropylene glycol isopropyl ether, propylene glycol butyl ether, diethylene glycol monohexyl ether or diethylene glycol butyl ether.

8. The composition of claim 7 wherein the glycol ethers have a viscosity of less than 20 cps.

9. The composition of claim 5, wherein the fluorescent toner is selected from the group consisting of urea formaldehyde toluene sulfonamide, polyester polyamide or dim ethyl hydantoin formaldehyde.

10. The composition of claim 9, wherein the polyester polyamide fluorescent toner has an acid number greater than 50.

11. The composition of claim 5, wherein the water soluble organic solvents individually or in solution do not exceed a viscosity of 20 cps.

12. The composition of claim 5, wherein the water soluble organic solvents have a vapor pressure less than 1 mm/Hg at room temperature.

13. The composition of claim 12, wherein the water soluble organic solvents is a glycol.

14. The composition of claim 5, further including 0.1 to 3.0 (Wt %) toning dye belong to the categories of acid, direct or basic dyes in order to increase the optical density without decreasing the fluorescence.

15. The composition of claim 14, wherein the toning dye is selected from the group consisting of C.I. Direct Yellow 86, C.I. Acid Yellow 210, C.I. Basic Yellow, 40, C.I. Basic Yellow 51, C.I. Basic Yellow 2.

16. The composition of claim 15, wherein the toning dye is soluble in the organic solvent and the penetrant.

17. The composition claimed in claim 5, wherein the soluble toners contain non ionic surfactants to increase the solubility of the ink.

18. The composition claimed in claim 17, wherein the non ionic surfactant has an HLB between 8 and 15.

19. The composition claimed in claim 18, wherein the non ionic surfactant is selected from the group consisting of: tridecyl alcohol alkoxylates and nonyl phenoxy poly (ethyleneoxy) ethanol.

20. The composition claimed in claim 19, wherein the non ionic surfactant is used at concentrations from trace to 3 Wt. %.

21. A red aqueous waterfast fluorescent ink composition consisting essentially of:
   a. 35–55 (Wt. %) water;
   b. 15–50 (Wt. %) water soluble organic solvents having a hydrogen bonding solubility parameter ($\delta_h$) greater than 5.0, a polar solubility parameter ($\delta_p$) between 8.0–8.7 and a dispersion parameter ($\delta_S$) between 8.4–10.0;
   c. 5–15 (Wt. %) fluorescent soluble toners with a molecular weight between 200 and a 1,000; and
   d. 5–15 (Wt. %) of glycol ether as a cosolvent penetrant.

22. The composition of claim 21, wherein the fluorescent toner is selected from the group consisting of urea formaldehyde toluene sulfonamide, polyester polyamide or dimethyl hydantoin formaldehyde.

23. The composition of claim 21, wherein the water soluble organic solvents are selected from the group consisting of 2-pyrrolidone, N-methyl pyrrolidone, sulfolane, or gamma butyrlactonelactone.

24. The composition of claim 21, further including 0.1 to 3.0 (Wt %) toning dye belonging to the categories of acid, direct or basic dyes.

25. The composition of claim 24, wherein the toning dye is selected from the group consisting of C.I. Direct Yellow 86, C.I. Acid Yellow 210, C.I. Basic Yellow, 40, C.I. Basic Yellow 51, C.I. Basic Yellow 2.

26. The composition of claim 24, wherein the toning dye is soluble in the organic solvent and the penetrant.

* * * * *